United States Patent

[11] 3,567,977

| [72] | Inventor | Kenneth H. McLean<br>3915 W. Clement Road, Boise, Idaho 83704 |
|---|---|---|
| [21] | Appl. No. | 662,987 |
| [22] | Filed | Aug. 24, 1967 |
| [45] | Patented | Mar. 2, 1971 |

[54] ASYMMETRICAL VOLTAGE WAVE GENERATOR
4 Claims, 4 Drawing Figs.

[52] U.S. Cl. .................................................. 310/111
[51] Int. Cl. .............................................. H02k 39/00
[50] Field of Search ........................................ 310/111, 156, 153, 67, 114, 126, 261, 269, 166; 123/149D

[56] References Cited
UNITED STATES PATENTS
1,183,286  5/1916  Farny .......................... 310/111
1,463,958  8/1923  Kettering .......................... 123/149
3,098,164  7/1963  Inoue .......................... 310/111

OTHER REFERENCES
Book—THEORY and CALCULATION of Electrical Apparatus - C. P. Steinmetz published 1917 by McGraw-Hill Co., pages 452 and 453.

Primary Examiner—D. X. Sliney
Attorney—Kimmel, Crowell & Weaver

ABSTRACT: An electric motor or generator for producing AC by selective induction of magnetic flux through differential coupling of a flux path through a rotatable armature which moves adjacent stators which may be wound and connected such that the output taken from the stators comprises a series of pulses to provide an alternating current output.

PATENTED MAR 2 1971

INVENTOR.
KENNETH H. MCLEAN,
BY
Kimmel, Crowell & Weaver
ATTORNEYS.

INVENTOR.
KENNETH H. McLEAN,
BY Kimmel, Crowell & Weaver
ATTORNEYS.

3,567,977

ASYMMETRICAL VOLTAGE WAVE GENERATOR

BACKGROUND OF THE INVENTION

1. Field of the Invention

The present invention relates to rotary electromagnetic motor and generator construction.

2. Description of the Prior Art

Perhaps the most pertinent prior art comprises devices for controlling magnetic coupling for producing wave patterns of desired shapes, etc., are known in the art. Such devices are described in U.S. Pat. No. 2,719,930 issued to Lehde, U.S. Pat. No. 2,454,367 issued to Artzt, and U. S. Pat. No. 2,120,109 issued to Merril.

SUMMARY

In brief, and without intending to limit the scope of the invention, the present invention consists of an electromagnetic device which may be a generator or a motor, but which will be described as a generator for convenience, which comprises a pair of stator windings and a rotor which is mounted to rotate between the stator windings. In the exemplary embodiment, the rotor is in the form of a magnet which is of constant polarity and may be a permanent magnet if desired. Special flux coupling means are provided for selectively coupling the flux from the rotor individually to the stators, such that by connecting the stators in series the resulting voltage produces an AC. A specific embodiment using two stators and an eccentrically rotated electromagnet as a rotor for selectively coupling the flux from the rotor to the respective stators is disclosed.

DESCRIPTION OF THE PREFERRED EMBODIMENT

The following is a description of an experimental model of the generator of this invention which was constructed and tested to prove the principle and the operability of the invention. Its construction is given as merely illustrative of the applicability of the concept and of the type of machinery which may be involved in carrying out the inventive concept. It must be understood, however, that the embodiment disclosed is merely exemplary of the invention and is constructed in a rather elementary form and, further, that conventional winding techniques and industrial practice in the construction of motors and generators will result in many variations of the present invention without departing from the spirit and scope thereof. With this reservation, the following description of the experimental model is given.

Figure 1:
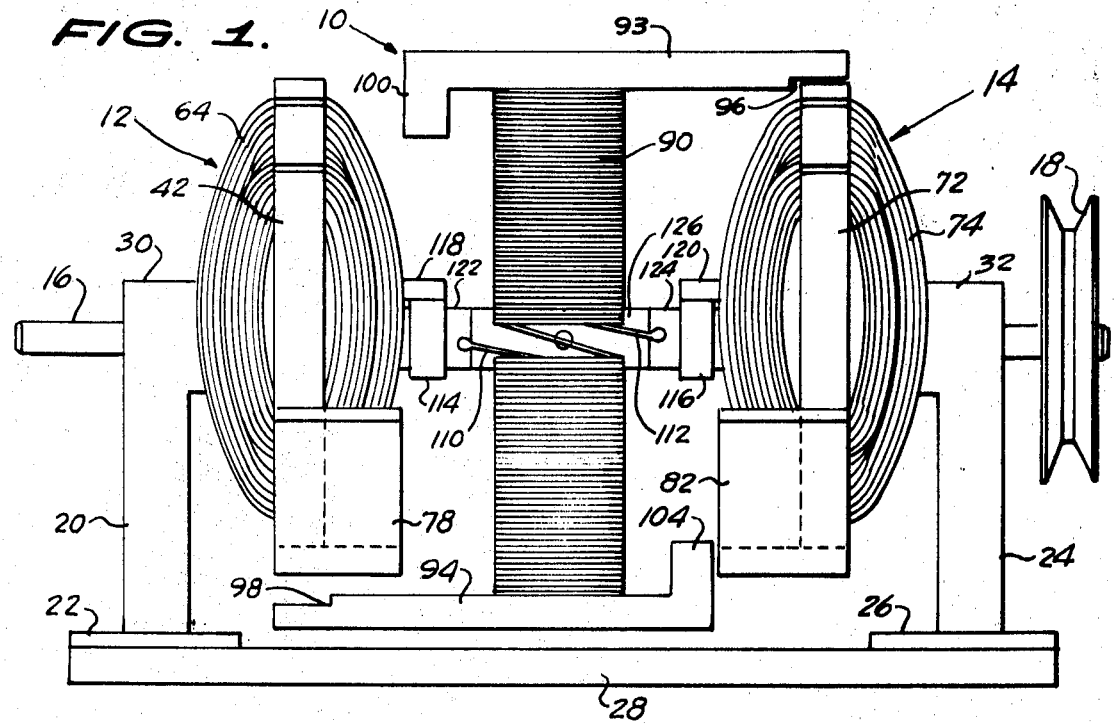
FIG. 1 is a side view of an experimental model of the generator which comprises the present invention.

Referring first to FIG. 1, the present invention comprises a magnetic rotor 10 which moves between two stators 12 and 14 on a shaft 16 which may be rotated by means of a pulley 18 or by an equivalent rotating means. The shaft 16 is supported by a bracket 20 having a foot 22, a bracket 24 having a foot 26, feet 22 and 26 being mounted on a supporting base 28. The bracket 20 includes an inwardly extending shaft supporting portion 30 and the bracket 24 includes an inwardly extending bracket supporting portion 32. The portions 30 and 32 are provided with aligned passageways which receive bushings 34 and 36 in which shaft 16 is rotatably received. Conventional lubrication ports may be included but are omitted for purposes of clarity of illustration. Any type of bearing would be satisfactory in lieu of the bushing 34 and 36.

Figure 2:
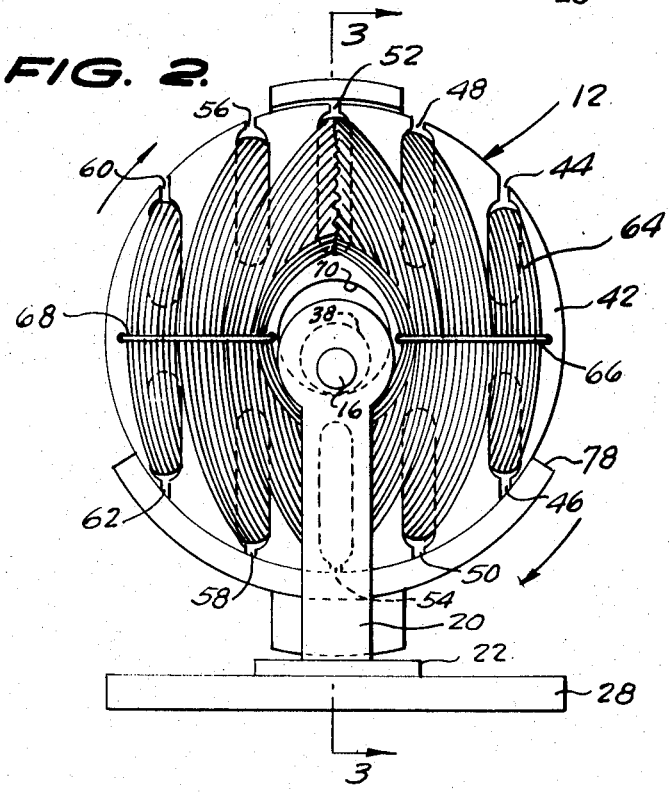
FIG. 2 is the end of the generator of FIG. 1 viewed from the left, as shown in FIG. 1.

The bracket portions 30 and 32 are provided with extensions 38 and 40 which extend from the ends of the brackets. It should be noted that the aperture in the brackets and the bushings 34 and 36 are not coaxial with either the bracket which, as illustrated in FIG. 2, is generally circular in configuration or with the extensions 38 and 40. The purpose of this eccentricity will be discussed hereinafter.

Viewing FIG. 1, the stator winding 12 appears on the left. The stator winding assembly 12 comprises a permeable core 42 which is made of a magnetically permeable material such as soft iron. In the experimental model, a single disc of soft iron was utilized; however, constructional methods known to the art, such as forming laminated cores to reduce eddy currents, etc. would preferably be utilized. The core 42 is provided with a plurality of slots which, as shown in FIG. 2, are parallel in a vertically oriented aligned disposition. That is, a pair of slots 44 and 46 are in parallel with a second pair of slots 48 and 50 which are, in turn, in parallel with slots 52 and 54, slots 56 and 58, and slots 60 and 62. A winding 64 intertwines in and out the slots to provide a magnetic field in the core when current is passed through the windings or, alternatively, to induce an electrical current in the windings when a moving magnetic field passes through the core to cut the windings. The winding 64 is held in place by a binder 66 on one side and another binder 68 on the other. It will be immediately obvious that this is not the optimum construction for the highest electromagnetic efficiency and many improvements will be immediately obvious to those skilled in the art and would fall within the scope of the invention.

Figure 3:
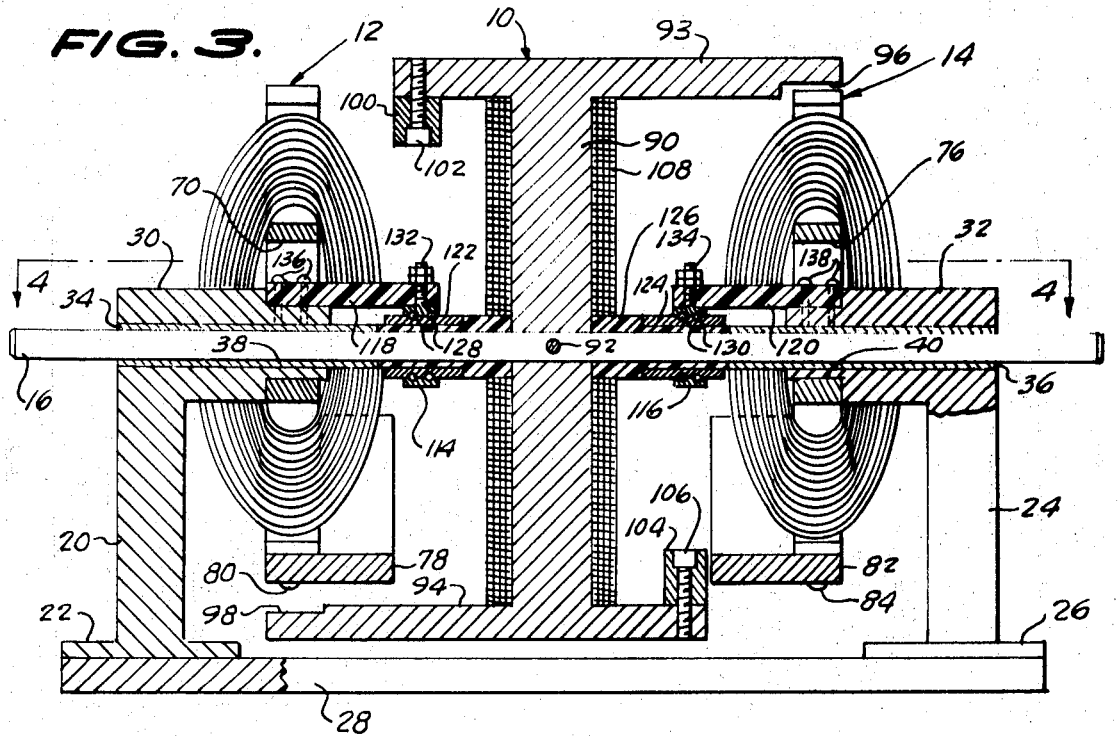
FIG. 3 is a side cross-sectional view of the generator taken substantially along lines 3—3 in the direction of the arrows, as shown in FIG. 2.

It will be noted that the core 42 is provided with a central circular opening 70. As shown in FIG 3, the extension 38 extends into the opening 70 and, as viewed in FIG. 3, is secured to the bottom edge of the opening 70. The securement may be formed by welding, riveting or otherwise securing the extension 38 to the core 42, or blocks may simply be placed in the opening 70 to ensure the proper positioning of the extension 38 therein.

It will be apparent from FIG. 2, and from FIG. 3, that the shaft 16 is not coaxial with the core 42, the latter being generally in the form of a circular disc having a central aperture therein.

The stator assembly 14 is of similar construction and includes a core 72 and a winding 74. The core 72 has a central opening therethrough 76 similar to the opening 70 in core 42. As previously described, with respect to stator assembly 12, the extension 40 is secured at the bottom eccentrically in the opening 76 and, consequently, eccentrically in the circular core 72.

As best illustrated in FIG. 3, an arcuate shoe 78 is secured by pins 80 to core 42 and an arcuate shoe 82 is secured by pins 84 to core 72. These shoes extend from the core inwardly and, circumferentially, extend less than one-half the distance around the core. The purpose of the shoe in each case is to form a magnetic coupling path to the armature 10.

Figure 4:
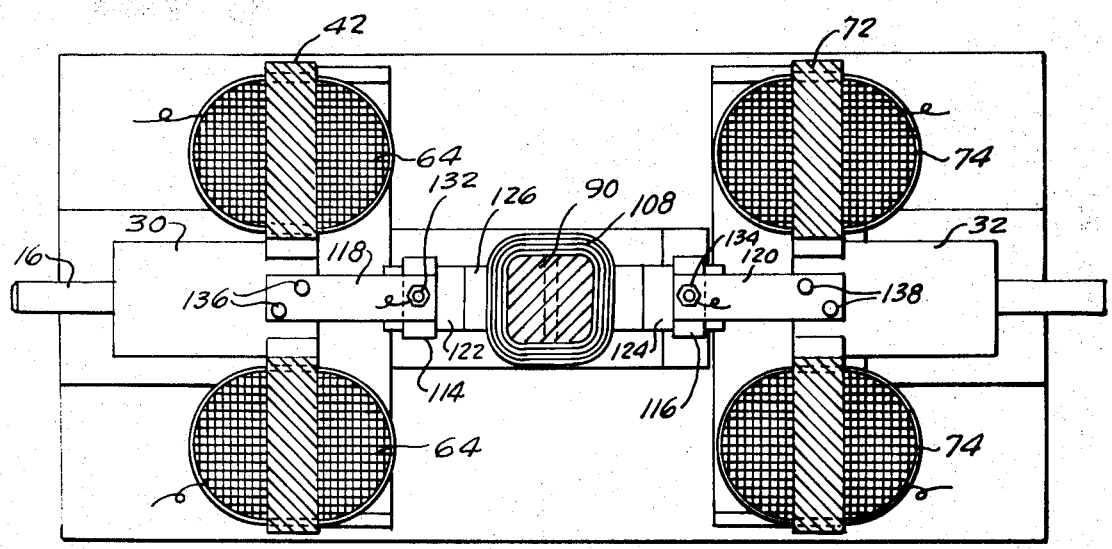
FIG. 4 is a top view in partial cross section taken substantially along lines 4— in the direction of the arrows, as shown in FIG. 3.

The armature 10 comprises a core portion 90, best shown in FIGS. 3 and 4, which is an elongate square rod of soft iron. The armature also includes a pair of crossbars secured at either end of the core 90. The crossbars 93 and 94 are notched, as shown at 96 and 98, respectively, at one end thereof and are provided with inwardly extending protuberances 100, secured by a bolt 102 to crossbar 93, and 104, secured by bolt 106 to crossbar 94. These protuberances, 100 and 104, complete a magnetic flux path through the respective cores, 42 and 72. This coupling is best shown in FIG. 3 wherein a complete path is provided from armature 90 through core 72 by means of crossbars 93 and 94, including gap 96 and the lip of protuberance 104, as well as the arcuate shoe 82.

A winding 108 is wrapped on the core 90 and is connected by means of leads 110 and 112 which provide current connection from fixed slip rings 114 and 116 which are supported by mounting blocks 118 and 120. The leads 110 and 112 are secured to rotatable slip rings 122 and 124. The rotatable slip rings 122 and 124 are carried by an insulating sleeve 126, best shown in FIG. 3, on shaft 16. If desired, a plurality of balls in races in slip rings 114 and 116, generally indicated at 128 and 130, may be provided for reducing friction. Any slip ring arrangement which makes adequate electrical contact is sufficient. Electrical connectors 132 and 134 are, respectively, provided for supplying a source of electric energy to the armature. The electric energy is direct current thus producing a single magnetic configuration. That is, one end of armature 90 is always north and the other end is always south, assuming the same electrical connection externally. It will be apparent that this is magnetically equivalent to a permanent magnet. As best illustrated in FIG. 3, the insulating supports for connectors 132 and 134, indicated at 118 and 120, are secured by pins 136 to the extension 38 and by pins 138 to the extension 40. This connection is also clearly illustrated in FIG. 4.

OPERATION

Reference is made to FIG. 1 which shows the electromagnetic device of this invention in a first position which will be used as reference in discussing the operation of the invention.

Considering the invention as a generator, the first step in the process of operation is to produce a magnetic field and to rotate the magnetic field. This is done by applying a voltage to the winding 108 on core 90 through the slip rings as described. The magnet may also be provided simply by making the core of a permanent magnet material such as Alnico. Less control, and in some cases, lower efficiency results by the use of permanent magnets, but otherwise there is no difference in operation. The magnetic field is rotated by rotating the magnet 90.

The next step is to selectively induce a first voltage during only a portion of the rotational cycle of the magnetic field in the first stator 12. The next step is to selectively induce a second voltage in the stator 14 during a different period of the rotational cycle, the second voltage being of the same polarity as the first voltage. The two voltages are then combined to produce a multiplicity of pulses of voltage of the first polarity.

The same result may be accomplished, though with lower efficiency, by inducing a third voltage of opposing polarity with respect to the first polarity in the stator 14 during the time the first voltage is induced into the stator 12 and, vice versa, to induce a fourth voltage of opposing polarity in the stator 12 at the time the second voltage is being induced in the stator 14. The third and fourth voltages are of substantially lesser average magnitude than the first and second voltages such that by a series connection the first voltage tends to override the third voltage and the second voltage tends to override the fourth voltage to produce a pulsating alternating current source of electrical power.

As a magnetic field is rotated by the rotation of armature 10, a magnetic field is coupled from the armature 10 through the core 72 by means of lug 104 which passes adjacent shoe 82 and notch 96 which passes adjacent the core 72 proper. In this configuration, the magnetic lines of force cut the winding 74 and tends to induce a voltage of a given polarity. Assume that this given polarity is positive, for purposes of discussion.

As the armature 10 moves the magnetic field therefrom is coupled through the core and cuts the windings 74. This continues until the lug 104 passes beyond the end of shoe 82. At that point, the effective coupling of the magnetic field from the armature 10 through the core 72 disappears because of the distance between the armature and the core of the stator 14. This condition obtains for, in the exemplary embodiment, one-half or more than one-half of the rotational cycle of the armature. As the armature continues to rotate, the lug 100 comes into proximity with the shoe 78 thus coupling the magnetic field through the core 42 of stator 14 from the armature 10. This coupling is maintained during the time the lug 100 on crossbar 93 is in proximity with the shoe 78 which, as previously explained, is less than one-half the cycle. The coupling could be maintained efficiently for exactly one-half the cycle if desired.

The eccentricity resulting from the noncoaxial disposition of the shaft 16 relative to the stator cores 42 and 72 results in an additional decoupling effect. Since the shaft is not concentric with the cores but is displaced downwardly, as illustrated in FIG. 1, there is no coupling between the end of cross bar 94 which is provided with the notch 98 when the lug 104 couples with the shoe 82. Conversely, the notch 96 on cross bar 93 couples with the other side of the core 72 to provide a complete path. The reverse of this obtains when the armature is inverted, as shown in FIG. 1, such that the lug 100 is adjacent the shoe 78.

It will be understood that because of leakage of flux and unavoidable coupling there will be third and fourth voltages induced in the respective armatures which oppose the first and second principal voltages in that they are of opposite polarity and 180° out of phase. By using two such stators connected in series, however, the voltage induced through stray coupling of the magnetic flux from the armature may be somewhat counterbalanced by the principal voltage induced by efficient coupling of the lines of flux from the armature such that the net result is an AC.

Now, the invention has been described in terms of its function as a generator but, as is universally understood, the same construction may operate as a motor by applying the appropriate voltages to the windings on the stator cores and on the armature. No extended discussion of this operation is necessary since, in view of the previous discussion, it will be quite apparent to those skilled in the art. Briefly, however, the operation as a motor results from the generation of a magnetic field in the stator core which opposes the magnetic field in the armature to cause a magnetic repulsion of like poles thus causing the armature to turn, according to electrical motor principles.

It must be emphasized that the embodiment of the invention described herein is exemplary of the invention and represents a working model which was constructed by the inventor on a limited budget and is not intended to represent the optimum in practical construction. Accordingly, it is expected and contemplated that the abstract, summary, disclosure and drawings be considered as merely exemplary of the invention and the principles discussed herein and not as limiting of the invention. It is further contemplated that the scope of the invention be limited only by the claims which follow.

I claim:

1. An asymmetrical voltage wave generator comprising:
   a normally horizontal supporting base;
   a cooperating stator member and rotor member;
   said stator member comprising a substantially upright discoidal core formed of a magnetically permeable material having a centrally located transverse axis;
   a winding on said discoidal core;
   an arcuate shoe formed of a magnetically permeable material fixedly connected on the peripheral edge of said discoidal core and having a portion thereof projecting laterally therefrom in one direction, said shoe extending over an arcuate length of substantially one-half the arcuate length of the periphery of said discoidal core;
   means connecting said discoidal core on said supporting base with said show laterally spaced therefrom;
   said rotor member comprising an armature core having a pair of opposed ends and being formed of a magnetically permeable material;
   means connecting said armature core on said support base for rotation around an axis centrally of the ends of said armature core and adjacent said projecting portion of said shoe;
   said transverse axis of said discoidal core and said central axis of rotation of said armature core being parallel and laterally spaced from one another whereby said ends of said armature core turn eccentrically relative to said discoidal core and its connected shoe, and with the turning radius of said opposed ends of said armature core being greater than the radius of said discoidal core and its said connected arcuate show;

a crossbar secured, respectively, on each end of said armature core, each crossbar being formed on a magnetically permeable material, and each of said crossbars having one end thereof projecting laterally from said armature core in the direction of said discoidal core;

said one end of one of said crossbars being of such length so as to span said arcuate shoe in spaced relationship relative thereto during a first portion of one cycle of rotation of said armature core and to move into close proximity relative to the periphery of said discoidal core during the remaining portion of the rotation of said armature core to form an airgap therebetween of shorter length that the airgap formed as said one end of said crossbar turns relative to said arcuate shoe;

the one end of the other of said crossbars being of shorter length than one end of said first crossbar and having a lug formed thereon extending in the direction of said one end of said first crossbar and being positioned to extend transversely of said arcuate shoe in close spaced relationship relative thereto during said first portion of said cycle of rotation of said armature core;

means for connecting said armature winding with a source of direct current to produce a magnetic field; and means connected with said armature core to effect rotation thereof around its said axis of rotation to magnetically couple said armature core with said discoidal core via said crossbars, said airgap and said lug, the magnetic field cutting said stator winding to induce a voltage therein having an asymmetric wave form configuration.

2. A generator as defined in claim 1 wherein:

said means for connecting said armature core on said support base includes a shaft;

a pair of slip rings on said shaft electrically insulated from one another; and means connecting said armature winding and said source of direct current with said slip rings.

3. A generator as defined in claim 2 and:

a second stator member cooperating with said rotor member;

said second stator member being identical to said first stator member;

means connecting said second stator member on said supporting base spaced from but proximate to said rotor member, and on that side thereof opposite said first stator member, said first and second stator members confronting one another;

said one crossbar having a second oppositely disposed end projecting in the direction of said second stator member;

a second lug connected on said last named crossbar and projecting in the direction of said first crossbar;

said second lug turning past the arcuate shoe of said second rotor during said remaining portion of said armature core cycle of rotation;

said other crossbar having an oppositely disposed end portion projecting in the direction of said second stator member and being of such length as to span said arcuate shoe of said second stator member as said armature core is rotated through its said remaining portion of its said cycle of rotation; and wherein said rotation of said armature core induces a second voltage in the winding of said second stator member.

4. A generator as defined in claim 3 and:

means electrically connecting the windings of said first and second stator members in series.